United States Patent
Balint et al.

[15] 3,697,579
[45] *Oct. 10, 1972

[54] METHOD OF ESTERIFYING A POLYCARBOXYLIC ACID WITH A GLYCOL

[72] Inventors: Laszlo J. Balint, Chester; Stanley D. Lazarus, Petersburg; William N. Russell, Colonial Heights, all of Va.

[73] Assignee: Allied Chemical Corporation, New York, N.Y.

[*] Notice: The portion of the term of this patent subsequent to Sept. 5, 1989, has been disclaimed.

[22] Filed: Sept. 18, 1969

[21] Appl. No.: 859,054

Related U.S. Application Data

[63] Continuation-in-part of Ser. No. 812,350, April 1, 1969, abandoned.

[52] U.S. Cl............260/468 R, 23/260, 252/188.3, 260/75 M, 260/470, 260/475 P, 260/485 G
[51] Int. Cl................................................C07c 69/82
[58] Field of Search............260/475 R, 75 M, 468 K

[56] References Cited

UNITED STATES PATENTS

| | | | |
|---|---|---|---|
| 3,496,146 | 2/1970 | Mellichamp | 260/475 |
| 3,497,473 | 2/1970 | Kemkes | 260/475 |
| 3,506,662 | 4/1970 | Higgins | 260/475 |

FOREIGN PATENTS OR APPLICATIONS

| | | | |
|---|---|---|---|
| 39/23564 | 10/1964 | Japan | 260/475 |
| 1,013,034 | 12/1965 | Great Britain | 260/475 |
| 1,136,455 | 12/1968 | Great Britain | 260/475 |

*Primary Examiner*—Lorraine A. Weinberger
*Assistant Examiner*—E. J. Skelly
*Attorney*—Luther A. Marsh and Roy H. Massengill

[57] ABSTRACT

The esterification of a polycarboxylic acid with a polyol is described under conditions of direct esterification and wherein the reacting mass is a flowable, uniform dispersion of (1) a paste of the said polycarboxylic acid and the said polyol, and (2) at least 3 parts by weight per part paste of a partially esterified product of said polycarboxylic acid with said polyol.

9 Claims, 1 Drawing Figure

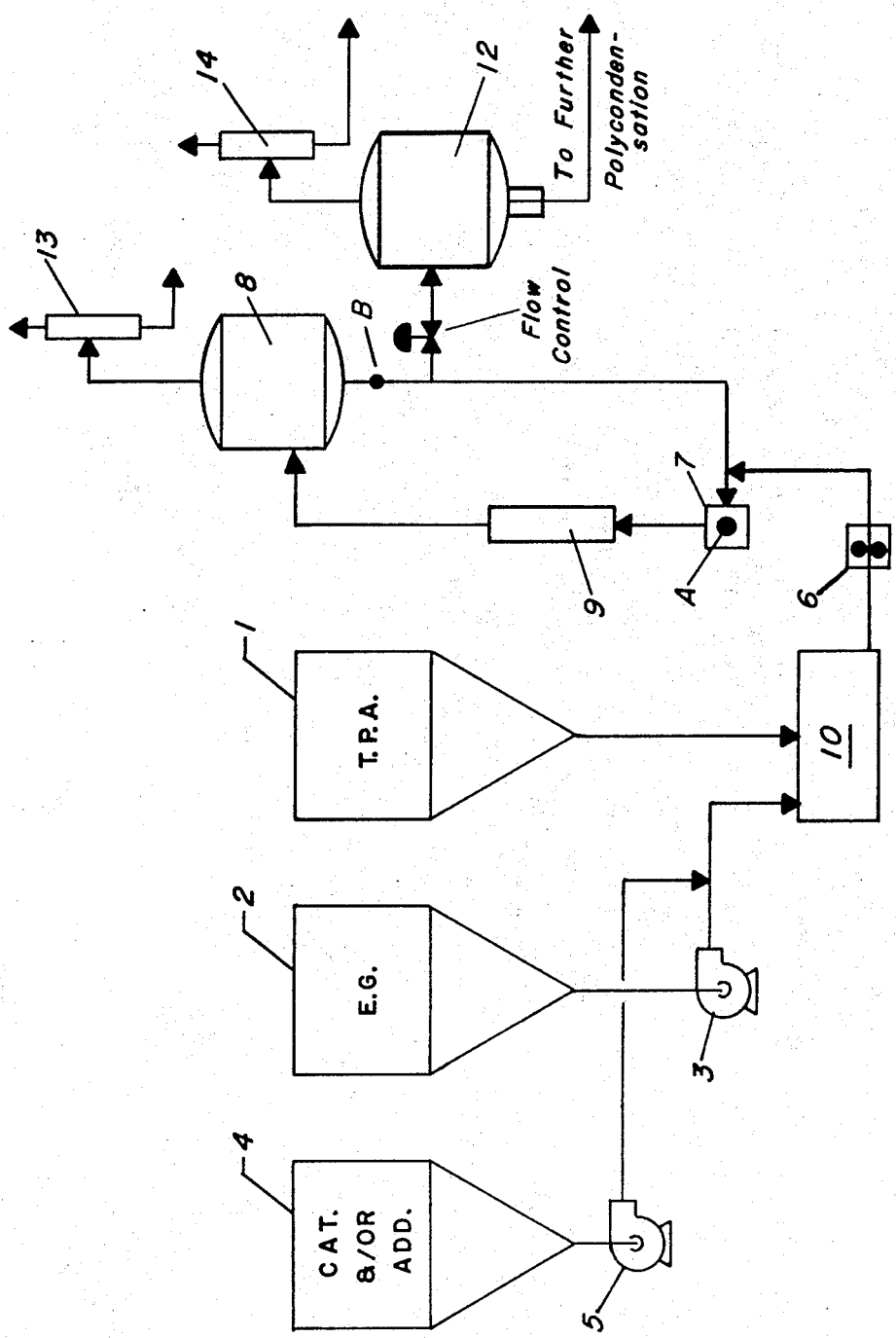

3,697,579

METHOD OF ESTERIFYING A POLYCARBOXYLIC ACID WITH A GLYCOL

CROSS-REFERENCE TO RELATED APPLICATION

This application is a continuation-in-part of our U.S. application Ser. No. 812,350, filed Apr. 1, 1969, now abandoned.

BACKGROUND OF THE INVENTION

This invention relates to an improved process of esterifying a polycarboxylic acid with a polyol. More particularly, it relates to an improved process for directly providing esters which can then be polycondensed into high molecular weight and high quality linear polyesters or copolyesters suitable for processing into fibers, films and other shaped articles as a continuous or discontinuous process.

Linear polyethylene terephthalate is presently produced on a commercial scale by the ester interchange reaction between dimethyl terephthalate and ethylene glycol. A direct esterification method has also been known since first disclosed by Whinfield and Dickson in 1941 and illustrated in U.S. Pat. No. 2,465,310; however, such process was viewed with essentially academic interest for many years as it presented no alternatives sufficiently important to be considered on a commercial scale. The process was unreasonably slow and produced a product of such inferior quality as to be substantially unusable. One of the reasons for the inferior quality was the presence of ether groups within the polymer chain which gave poor results when such polymers were subsequently processed into fibers and films.

Other U.S. patents, such as U.S. Pat. Nos. 3,024,220, 3,050,533 and 3,050,548 illustrate various other process improvements of the direct esterification route in preparing linear polyesters. Although many improvements have been made in the direct esterification route for preparing linear polyesters to the extent that some commercial use is made of this process, many problems still exist such as the necessity of using high glycol to acid ratios and/or the use of expensive agitated multiple reactor systems. The use of such high glycol-acid ratios and multiple reactor systems adds substantially to its preparation cost and can yield a poor quality product.

The art is also beset with the problem of how to best enhance the dissolution of the terephthalic acid in the esterification reaction mass, since it is known that the rate of dissolution of the terephthalic acid is directly proportional to the rate of the esterification reaction. It is also known, however, that the particle size of the terephthalic acid affects its rate of dissolution, and, accordingly, steps have heretofore been taken to control the rate of the esterification reaction by employing terephthalic acid of given particle sizes only. Nevertheless, it will of course be appreciated that particle size thus becomes a critical parameter in the aforementioned direct esterification.

Other problems plaguing the art comprise (1) the difficulty in obtaining via the direct esterification route a polyester having an intrinsic viscosity of 1.0 and greater by means of a continuous melt polymerization, and (2) the difficulties arising out of an abundance of oligomers in the distilled vapor overheads of the various reaction vessels.

It has also been observed in using a paste mixture of terephthalic acid and ethylene glycol that the paste tends to harden and plug the equipment or the ingredients separate out in the critical temperature range thus creating process problems totally alien to the older ester interchange route basically used heretofore, as well as to other direct esterification processes.

SUMMARY OF THE INVENTION

Therefore, it is a prime object of this invention to provide an improved process for the direct esterification of a polycarboxylic acid with a polyol.

Another object of this invention is to provide an improved process for directly preparing esters which can then be conveniently polycondensed into high molecular weight and high quality polyesters or copolyesters suitable for processing into fibers, filaments, films and other shaped articles as a continuous or discontinuous process.

Another object is to provide a more economical process than heretofore and one which is capable of being operated continuously over an indefinite period of time.

Yet another object of this invention is to provide an improved process wherein the particle size of the reactant polycarboxylic acid is not a significant parameter.

Still another object is to provide an improved process wherein the formation of objectionable ethers such as diethylene glycol is inhibited during the esterification reaction, even in the absence of added ether inhibitors.

Still another object is to provide an improved process which is capable of affording a polyester having an intrinsic viscosity of 1.0 or more by a continuous melt polymerization, and one which is not characterized by an abundance of oligomers in reactor overheads.

Still another object is to provide an improved process which is substantially insensitive to short term fluctuations in the polyol/polycarboxylic acid mol ratio.

In attaining the objects of this invention, one feature resides in the direct esterification of a flowable uniform dispersion comprised of a paste of a polycarboxylic acid and a polyol with which has been admixed 3 parts or more by weight (per 1 part paste) of a partially esterified or prepolymerized product (having a degree of conversion of between about 30 and 85 percent, and even higher) of like reactants. The product of this direct esterification can then be polycondensed to obtain an improved polyester of desired quality and molecular weight.

Another feature of this invention resides in employing a continuously recirculating mixture of the partially esterified or propolymerized product.

Other objects, features and advantages of this invention will become more apparent from the following description when taken in conjunction with the accompanying FIGURE of drawing.

BRIEF DESCRIPTION OF THE DRAWING

The FIGURE of drawing is a diagrammatical drawing of apparatus useful in carrying out the method of this invention.

DETAILED DESCRIPTION OF THE INVENTION

In the FIGURE of drawing, terephthalic acid stored in the tank 1 is continuously fed to the mixer 10 via a conveyor (not shown). Also continuously fed to the mixer 10 are ethylene glycol stored in the tank 2 by means of the pump 3, and, optionally advantageously, catalyst (esterification and/or polycondensation) and/or additive stored in the tank 4, this latter by means of the pump 5. In the mixer 10 agitation is performed whereby the terephthalic acid, ethylene glycol and, optionally advantageously, 95 catalyst and/or additive are converted to a paste. The the is then pumped from the mixer 10 by a feed pump 6 to the inlet of the circulating pump 7. The paste mixture is next combined with recirculating or recycle partially esterified product from the reactor-separator 8 and pumped therewith by the circulating pump 7 through the esterification reactor or heater 9, for example, a multiple tube heat exchanger. Effluent of the heater 9 passes overhead to the reactor-separator 8 for vapor-liquid separation and further reaction. Part of the reactor-separator effluent is returned to the inlet of the circulating pump 7 where it is combined with fresh paste. The remainder of the effluent of the reactor-separator is metered to a second reactor 12, the first in a series of polycondensation reactors, wherein esterification is substantially completed (in excess of 95 percent esterification). Overheads from both the reactor-separator 8 and the second, polycondensation reactor 12 are found to contain less than about 0.2 percent oligomers, calculated on the weight of terephthalic acid fed, in the distilled vapors of the condensers 13 and 14, respectively.

In accordance with this invention, the ethylene glycol (EG) and the terephthalic acid (TPA) are advantageously admixed in a mol ration of from about 1.1 to about 2.0 mols EG per mol TPA, and preferably in a mol ratio EG/TPA of from about 1.3 to about 1.6. Surprisingly, it has been found that by combining the paste mixture with recirculating or recycle partially esterified product, in an amount ranging from between about 3 to about 100 parts recycle, and more preferably between about 40 to about 80 parts recycle, for every one part paste, the reaction starts essentially immediately since the terephthalic acid dissolves essentially instantly in the recirculating mixture, whereas, when slurries are reacted, the undissolved terephthalic acid (at the center of solid particles of the same) cannot enter into the reaction. It will thus be appreciated that a particularly desirable feature of this invention is that it enables one to employ terephthalic acid of no particular particle size other than that readily commercially available from a variety of sources. The reason that the rate of dissolution of the terephthalic acid and consequently the rate of reaction are not significant parameters according to the instant process is because dissolution of the TPA at the point of admixture with the recycle is markedly enhanced due to an abundance of available hydroxyl groups with which the TPA can react at such point. These hydroxyl groups are available both from the ethylene glycol present in the paste and recycle, as well as from the mono- and bis-hydroxyethyl terephthalates also present in said recycle.

Another especially desirable feature of this invention is that the reaction is substantially insensitive to short term fluctuations in the EG/TPA mol ratio, since the glycol feed is combined almost instantly with the carboxyl groups, and the excess is evaporated with the water of reaction.

Furthermore, admixture of a paste with the recirculating mixture (believed to be aided by the pressure in the system) functions to impart a temperature to the reacting mass at the point of admixture, labeled as point A on the FIGURE of the drawing, which is characteristically lower than the temperature of the recirculating mixture withdrawn from the reactor-separator. This temperature change affords the added advantage of assisting in halting the evolution of glycol. The paste itself is supplied at a temperature higher than that which would stop the reaction, but lower than that which would cause plugging in the system. It has also been found that the time required for the reacting mass to pass from the point A through the heater and thence through the reactor-separator to the point B (whereat the temperature of the reacting mass again attains the temperature conditions existing in the reactor-separator) substantially corresponds to the reaction time for attaining a degree of esterification at the point B which substantially corresponds to that which would have existed in the recirculating mixture at the point A had not the paste been there added to effectively reduce the degree of esterification of the entire mass a percentage point or two, or even more. Stated differently, and presupposing an insignificant variation in degree of esterification along the line B–A and a reduction in degree of esterification preferably to not lower than that existing at the clear point, a direct, graphically reproducible relationship exists between the difference in temperature or $\Delta T$ at the points A and B and the difference in percent esterification or $\Delta E$ at these same points. In a specific example of the above phenomenon according to the invention, and in conjunction with a heater maintained at about 260°C. and a reactor-separator maintained at about 270°C. and under 90 psig pressure, it was found that the addition of 40 parts recirculating mixture to a 1.5 EG/TPA paste (0.6 – 0.65 parts TPA) resulted in a lowering of the temperature to a value of about 262°C. and a degree of esterification of about 78 percent at the point A, in contrast to the conditions of 270°C. and 80 percent esterification existing at the point B. An equally significant feature of the cooling parameter or $\Delta T$ according to the invention is that, in the absence of same, it was observed the system becomes severely plugged. Elimination of this plugging problem is therefore a prime attribute of the subject continuous process.

Another characteristic of the subject process is that it enables the use of an EG/TPA ratio that is as close to unity as is practicable. This of course avoids glycol wastes and shifts the economics of the process more to the favorable side.

The reaction of the TPA with the EG according to the invention is so fast that the product leaving the reactor-separator contains enough bound glycol to enable same to be further condensed to a high viscosity, for example, an intrinsic viscosity of about 1.0, with an incidence of carboxyl end groups of less than 15 and a substantial absence of any free glycol in this effluent product. It has also been found that charging a suitable polycondensation catalyst with the raw materials for esterification causes simultaneous polycondensation to occur with the esterification. This reduces the amount of volatile mono- and bis-hydroxyethyl terephthalates, thereby increasing yield and enabling higher temperatures and lower pressures to be used in a third and subsequent reactors, polycondensation reactors not shown in the FIGURE of drawing, with no problem of blocking of vapor lines due to distillation of oligomers. The product stream from the illustrated second reactor to reactor 3 (not shown) is essentially a plug flow which yields a high and uniform degree of polymerization (of from 6 to 8) in the reactor 3 feed since short-circuiting does not occur. Less than 0.2 percent oligomers are found in the overheads from the reactor-separator and reactor 2.

The direct esterification of the polycarboxylic acid and the polyol may start in the heat exchanger at a temperature as low as about 200°C. and range up to about 300°C. at atmospheric and superatmospheric pressures ranging up to about 500 psig. However, more preferably the mixture is initially heated to a temperature of about 230°C. to about 270°C. and at a pressure, when superatmospheric pressure is employed, ranging from about 50 to about 250 psig. The actual reaction times will vary depending upon the reaction temperature and pressure.

The condensation of polymerization of the glycol polycarboxylic acid ester is then carried out at temperatures ranging from about 260°C. to about 300°C. in one or more reactors and under reduced pressures which can be as low as 0.1 torr. The condensation of polymerization is carried out under these conditions for periods of from about 2 to about 10 hours and preferably from about 2 to about 6 hours until a polymerization product of the requisite molecular weight, as determined by viscosity or other convenient physical measurement, is obtained. The duration of the condensation depends upon the predetermined polymerization conditions, such as, batch or continuous process, temperature and pressure profiles, catalyst concentration, surface generation conditions, etc. The polymerization mass, in a continuous polymerization process, can be agitated continuously to give maximum exposure to the vacuum which assists in removing any unreacted glycol.

Various additives may be added with the polycarboxylic acid polyol feed or during the direct esterification reaction in order to further control the reactions or characteristics of the final polymer as required for specific end uses. For example, if fatigue resistance is desirable, an amount of diphenylene phenylene diamine can be added. Other well known additives can be used to control such characteristics of the finished polymer as heat and light stability, dye uptake, adhesion, static dissipation, luster, flammability and the like. Other frequently used additives are dyestuff precursors and assistants, non-reactive and heterogeneous polymers, pigments, fluorescent agents, brighteners and the like. Reaction control additives such as esterification or polycondensation catalysts, ether inhibitors, chain terminators, etc. can also be added with the polycarboxylic acid-polyol feed or during the direct esterification.

The esterification catalysts may be added in small catalytic amounts, e.g., 0.001 to 1 percent by weight based upon the feed. Representative examples of such catalysts are paratoluene sulfonic acid, zinc salts such as zinc chloride, tin oxide, tin tetrachloride, tin octoate and various of the amines. Likewise with respect to the polycondensation catalysts which include the compounds of antimony as antimony oxide, lead oxide, sodium alcoholate, lithium hydride, zinc acetate and zinc acetylacetonate. Suitable ether inhibitors (especially of diethylene glycol), which are preferably added in amounts of from 0.01 to 0.30 percent by weight glycol, comprise sodium, sodium methoxide, sodium acetate, sodium terephthalate, manganous acetate and calcium acetate.

In preparing the linear, high molecular weight polyester contemplated by the invention, the process can be advantageously operated as a continuous process by continuously feeding a mixture of polycarboxylic acid and polyol into about 3 to about 100 parts, preferably into about 40 to about 80 parts, of recirculating polycarboxylic acid ester-polycarboxylic acid-polyol water mixture and feeding the resultant admixture into a heater to provide a continuous flowable uniform dispersion of said admixture and then introducing the admixture into a polymerizing apparatus and further esterifying and condensing the admixture until the desired molecular weight is obtained. The type of reaction admixture required for maintaining a continuous dispersion feed to the heater is obtained by introducing one part of the polycarboxylic acid and polyol paste mixture to from about 3 to about 100 parts, preferably to from about 40 to about 80 parts, or more of the recirculating polycarboxylic acid ester-polycarboxylic acid-polyol water mixture wherein said polycarboxylic acid is from about 30 to about 85 percent esterified and wherein the temperature of said admixture is maintained between about 230°C. to about 270°C. and the pressure is maintained between about 50 and about 250 psig. The polycarboxylic acid attains a degree of esterification of from at least about 30 percent in the heater, and up to as much as 85 percent and even higher in the reactor-separator from whence the recirculating mixture is withdrawn.

By the method of this invention, and perhaps most importantly, an aid to the ultimate finishing of the polymer is also provided because the products exiting the reactor 2 and subsequent reactors (conventionally up to a total of five reactors, including the reactor-separator) display intrinsic viscosities which are correspondingly higher than those obtainable from the respective reactors employed not in conjunction with this invention. Alternatively, it is ev possible according to the invention to eliminate altogether one or more of such reactors while at the same time still being able to provide polymer suitable for the production of staple, filament and tire cord. This latter has the advantage of requiring less residence time in a finisher with concomitant less degradation of polymer due to the fact that exposure to polymer degradative conditions as elevated temperatures is diminished. As exemplary of the aforesaid alternatives which eliminate a part of the apparatus requirement heretofore considered necessary in the art, in one instance the effluent of reactor 2 is pumped to a reactor or finisher of thin film type maintained at 285°C. and 1.5 mm Hg. pressure directly wherefrom there is obtainable polymer of an intrinsic viscosity in the order of 0.55 and melting point of 255°C. In another such instance, the effluent of reactor 2 is pumped into a third reactor maintained at 280°C. and 1.5 mm Hg. pressure and the effluent of said reactor 3 then pumped to a fourth and final reactor maintained at 290°C. and 0.5 mm Hg. pressure to produce a superpolyester having an intrinsic viscosity of 0.95 and a melting point of 256°C.

PREFERRED EMBODIMENTS

The following examples illustrate first the problem encountered and then the practice and principles of this invention illustrating how the problem was solved, but it should be understood that these are given by way of illustration and not of limitation and that many changes in the details can be made without departing from the spirit of the invention.

EXAMPLE 1

Forty one and one-half pounds per hour of terephthalic acid and 24.8 pounds per hour of ethylene glycol in a glycol to acid mole ratio of 1.6 are mixed in a paddle mixer and pumped into a pipe reactor heated with Dowtherm at 270°C. The pressure gauge on the feed pipe indicated increasing pressure until after about two minutes the pressure increased to 350 psig and the pump motor automatically shut off. After several minutes the pressure decreased and the feed was again started. Once again the pressure increased to such an extent that the pump motor automatically shut off. After several starts and stops, the pipe was dismantled and inspected. Solid hard paste formation was found in one third of the preheater pipe section indicating that during heat-up, at a certain temperature range the paste changes in physical properties wherein it passes from a viscous state into a solid state. Thus this system of operation was abandoned.

EXAMPLE 2

Using the apparatus of the figure of drawing, 41½ pounds per hour (0.25 lb moles/hr.) of purified terephthalic acid and 23 pounds of ethylene glycol per hour (0.37 lb. moles/hr.) and 0.08 pounds per hour of diisopropylamine were continuously fed to the paddle mixer where they were converter to a paste. The paste mixture was then pumped from the mixer by the feed pump to the inlet of the circulating pump. The paste mixture was pumped with 40 parts of recirculating mixture by the circulating pump through the multiple tube and shell heat exchanger where it was heated to 260°C. After leaving the heat exchanger, the mixture entered a reactor-separator which was maintained at 260°C. by conventional Dowtherm heating means, and 90 psig pressure by means of an automatic vent valve. The terephthalate ester, terephthalic acid, glycol-water mixture leaving this reactor was split, with part returned to the inlet of the circulating pump where it was combined with fresh paste and part flowed to the first in a series of reactors where polycondensation took place by conventional means. The pressure differential between the esterification reactor and the first polycondensation reactor caused the material to flow toward the polycondensation reactor, but a level control actuated a valve which prevented all of the effluent from taking that route in preference to the route returning to the inlet of the circulating pump. Therefore, approximately 2,560 pounds per hour of partially esterified material were returned to the circulating pump.

The final polymer (after two steps of polycondensation) was extruded through a one hole die plate into a quenching water trough and into a pelletizer. The properties of the final polymer after drying were found to be as follows: Intrinsic viscosity in 60 percent phenol-40 percent tetrachloroethane mixture = 0.67, carboxyl end groups = 16 equivalents per $10^6$ grams, and the melting point = 256°C. as determined on a Differential Thermal Analyzer, using a heating rate of 4°C./minute. Analysis of samples showed that the effluent of the first reactor was 96.5 percent esterified. The system operated without plugging of the heat exchanger.

EXAMPLE 3

Fifty-four pounds per hour of a mixture of 90:10 of 2, 6:6,7-napthalene dicarboxylic acid and 23 pounds of ethylene glycol per hour were continuously fed to a paddle mixer where they were converted to a paste. The process was then carried out in the same apparatus and in the same manner as in Example 2 except:

a. the heater and esterification reactor were operated at 270°C. and the same percentage of the effluent was recirculated from the first reactor by the circulating pump and b. the polymerization reactors were operated at temperatures progressively rising from 285°C. to 295°C. The properties of the final polymer after drying were found to be as follows: Intrinsic viscosity = 0.82, carboxyl end groups = 11 equivalents per $10^6$ grams, and the melting point = 255°C. as determined on a Differential Thermal Analyzer, using a heating rate of 4°C./minute. Analysis of samples showed that the aromatic acid in the effluent of the first reactor was 74 percent esterified. The system operated for 30 hours before stopping this test without the plugging of the heat exchanger.

EXAMPLE 4

Again using the apparatus of the figure of drawing, 41½ per hour of coarse grained terephthalic acid and 23 pounds of ethylene glycol per hour (EG/TPA = 1.5/1.0) and polycondensation catalyst supplying 0.0248 pounds per hour of antimony (600 ppm.) and 0.1245 pounds per hour of diisopropyl amine (0.3 percent) were continuously fed to the paddle mixer where they were converted to a paste. The paste was then pumped from the mixer by the feed pump to the inlet of the circulating pump. The paste mixture (one part) was pumped with 80 parts of recirculating mixture by the circulating pump through the heater as in Example 2. The heater was maintained at 275°C. and the reactor-separator was maintained at 275°C. and atmospheric pressure. Part of the separator effluent was returned to the inlet of the circulating pump where it was combined with fresh paste. The rest of the separator effluent was metered to another reactor maintained at 275°C. and atmospheric pressure in which the esterification was substantially completed (>95 percent esterified). Less than 0.2 percent of the TPA feed was found in the distilled vapors as oligomers. The esterified product of this second reactor had an intrinsic viscosity of 0.09, degree of polymerization about 6 and melting point of 240° – 245°C. The distilled vapors were again found to contain less than 0.2 percent oligomers. This product was continuously fed into a third reactor maintained at a temperature of 275°C. and a pressure of 50 mm. Hg. The third reactor effluent was perfectly white and had an intrinsic viscosity about 0.24, degree of polymerization about 25 and melting point of 256°C. No problem was encountered due to oligomers distilling out of the reaction mixture. The product of the third reactor was further processed through two additional reactors in which the intrinsic viscosity was increased first to 0.62 and finally to 1.00. These final two reactors operated at about 2.0 and 0.5 mm Hg. pressure and 285° and 295°C., respectively. Residence times in the reactors of this process were as follows:

| Reactor | Time (Hours) |
| --- | --- |
| 1 | ½ |
| 2 | 1 |
| 3 | 1 |
| 4 | 2 |
| 5 | 2 |
| Total | 6.5 hours |

EXAMPLE 5

Forty one and one-half pounds per hour of fine grained terephthalic acid and 20.46 pounds per hour of ethylene glycol (EG/TPA = 1.4/1.0) and polycondensation catalyst, 0.332 pounds per hour, supplying 800 ppm. of antimony and 0.1245 pounds per hour of diammonium terephthalate were fed into the equipment described in Example 4. The paste was combined with recirculating mixture from the reactor separator in the ratio of 1 part to 40 parts. A sample indicated that a clear solution was produced within 15 seconds of the time that the paste was combined with the recirculating mixture. The fine particle size of the terephthalic acid appeared to have no effect on the reaction as compared with previous examples. The heater and reactor-separator were maintained at 265°C. at a pressure of 90 psig. Part of the effluent from the first reactor was recirculated and part was metered into the second reactor which was maintained at 275°C. and atmospheric pressure. Overheads from the second reactor contained less than 0.2 percent oligomers calculated on the weight of terephthalic acid fed. Effluent of reactor 2 had an intrinsic viscosity of 0.10, degree of polymerization about 8, and melting point of 240°C. It was pumped into a third reactor maintained at 280°C. and 2.5 mm Hg. pressure where it was converted to polymer having an intrinsic viscosity of 0.45 with melting point of 256°C. A fourth reactor maintained at 290°C. and approximately 0.2 mm Hg. pressure converted the polymer into a superpolyester having intrinsic viscosity of 0.95 and melting point 256°C. Thus only four reactors were needed in contrast to Example 4 in which five reactors were used. Total residence time in the four reactors was 4.5 hours.

EXAMPLE 6

The procedure of Example 4 was duplicated except that the product of the second reactor was fed to a thin film reactor maintained at 285°C. and 1.5 mm Hg. pressure. The product of this reactor had an intrinsic viscosity of 0.55 and melting point of 255°C. and was suitable for the production of staple fiber. It is to be noted that only three reactors with a total residence time of 3½ hours were needed to produce polymer suitable for conversion to useful textile fiber.

The invention was been illustrated particularly with respect to the use of terephthalic acid and naphthalene dicarboxylic acid and ethylene glycol as reactants. It can also be used to prepare polyesters from other acids and other glycols. For example, instead of terephthalic acid and naphthalene dicarboxylic acids such aromatic dicarboxylic acids as phthalic acid, isophthalic acid, phthalic anhydride, and p,p'-diphenyl dicarboxylic acids; cycloaliphatic dicarboxylic acids such as hexahydroterephthalic acid and aliphatic dicarboxylic acids such as succinic acid, adipic acid, sebacic acid, etc., can be used as well as substituted acids such as 5-sulfo-isophthalic acid, etc. Polyesters of glycols other than the most preferred ethylene glycol can also be similarly processed. Such glycols are the linear and alicyclic alkylene glycols having two to about 10 carbon atoms per molecule. The more preferred glycols, however, are the low moledular weight glycols which contain two to about four carbon atoms since they produce highly polymerized esters having high melting points. Such glycols include propylene glycol, butylene glycol, trimethylene glycol, tetramethylene glycol, decamethylene glycol, 1,4-cyclohexane dimethanol, 1,3-cyclobutane dimethanol and mixtures thereof. This invention can also be used to prepare copolyesters by reacting one or more acids with one or more of the glycols.

Many advantages are obtained through the use of this process. The free acids utilized in a direct esterification process are more reasonable in cost as compared to the dialkyl esters previously used in the esterinterchange process of the prior art and plant equipment costs are also reduced by utilizing the process of this invention. Furthermore, by maintaining a flowable precursor dispersion for continuously maintaining the reaction, continuous processing is made possible with its consequent economies. Still further, reaction rates are rapid, and substantially complete esterification reaction is carried out in a minimum of time, and higher intrinsic viscosities are obtained than heretofore. Further advantages are obtained by being able to use lower glycol-acid ratios as well as less expensive equipment. Other advantages in addition include the ease of use of catalysts and other additives where necessary or desired both in the direct esterification step or in the condensation or polymerization step of this process. That is, this new and improved process enables the use of any additive quite simply, thereby enabling one skilled in the art to prepare substantially any polymer required or desired.

From the foregoing discussion, description and data, it is easily observed that the present invention provides a significant contribution in the art of preparing high molecular weight polyesters and copolyesters suitable for use in the preparations of fibers, filaments and films. While the invention has been described with regard to specific detail, it will be appreciated that changes can be made without departing from its scope.

What is claimed is:

1. In the esterification of a polycarboxylic acid selected from the group consisting of terephthalic acid, isophthalic acid, naphthalene dicarboxylic acid, and hydrogenated derivatives thereof with ethylene glycol under conditions of direct esterification, the improvement which comprises subjecting to such reaction conditions a flowable, uniform dispersion comprised of (1) a paste of the said polycarboxylic acid and the said glycol, and (2) at least about 40 to about 80 parts by weight per part paste of an about 74 percent to about 95 percent esterified product of said polycarboxylic acid with said glycol, and (3) continuously recycling said esterified product while continuously admixing said paste therewith at a predetermined point in the recycle system.

2. The esterification as defined by claim 1, further comprising establishing a zone of diminished reaction temperature at the point of admixture of the paste (1) with the recirculating partially esterified product (2).

3. The esterification as defined by claim 2, wherein the degree of partial esterification at the zone of diminished reaction temperature is less than that existing in the reaction effluent.

4. The esterification as defined by claim 1, wherein the temperature of reaction is maintained between about 200°C. and about 300°C., and the pressure is maintained between about 50 and about 250 psig.

5. The esterification as defined by claim 4, wherein the molar ratio of the said glycol to the said polycarboxylic acid is 1.1:2.0.

6. The esterification as defined by claim 5, wherein the molar ratio is 1.3:1.6.

7. The esterification as defined by claim 1, wherein a member selected from the group consisting of an esterification catalyst, a polycondensation catalyst, an ether inhibitor and mixtures thereof is added to the reaction mixture either prior to, during or subsequent to the addition of the partially esterified product.

8. The esterification as defined by claim 1, further comprising subjecting the esterified product thereof to conditions of additional esterification.

9. A composition of matter susceptible to esterification and polycondensation to a high molecular weight linear polyester which comprises a uniform, flowable dispersion of (1) a paste of a polycarboxylic acid selected from the group consisting of terephthalic acid, isophthalic acid, naphthalene dicarboxylic acid, and hydrogenated derivatives thereof and ethylene glycol and (2) at least about 40 to about 80 parts by weight per part paste of an about 74 percent to about 95 percent esterified product of said polycarboxylic acid with said glycol.

* * * * *

PO-1050
(5/69)

UNITED STATES PATENT OFFICE
CERTIFICATE OF CORRECTION

Patent No. 3,697,579      Dated October 10, 1972

Inventor(s) L. J. Balint, S. D. Lazarus and W. N. Russell

It is certified that error appears in the above-identified patent and that said Letters Patent are hereby corrected as shown below:

Column 2, line 58, "propolymerized" should be --prepolymerized--.

Column 3, line 12, the number "95" should be deleted and the word --the-- should be added before "catalyst".

Column 3, line 13, after "The" delete "the" and add --paste--.

Column 5, line 28, after "condensation" delete "of" and add --or--.

Column 6, line 53 "ev" should be --even--.

Column 7, line 48, "converter" should be --converted--.

Signed and sealed this 26th day of November 1974.

(SEAL)
Attest:

McCOY M. GIBSON JR.
Attesting Officer

C. MARSHALL DANN
Commissioner of Patents